(12) United States Patent
Chen

(10) Patent No.: US 8,267,114 B1
(45) Date of Patent: Sep. 18, 2012

(54) INTEGRATED POSITIONING MECHANISM OF HYDRANT SHELL PLATE

(75) Inventor: Frank Kee-Suo Chen, Changhua (TW)

(73) Assignee: Crescent Plumbing, Inc., Shianshi Shang, Changhua (TW)

( * ) Notice: Subject to any disclaimer, the term of this patent is extended or adjusted under 35 U.S.C. 154(b) by 337 days.

(21) Appl. No.: 12/621,015

(22) Filed: Nov. 18, 2009

(51) Int. Cl.
*F16K 21/00* (2006.01)

(52) U.S. Cl. .................................. 137/315.01; 137/801

(58) Field of Classification Search ............. 137/315.01, 137/315.12, 801
See application file for complete search history.

(56) References Cited

U.S. PATENT DOCUMENTS 5,518,016 A * 5/1996 Sharwark ................ 137/315.12

* cited by examiner

Primary Examiner — Kevin Lee
(74) Attorney, Agent, or Firm — Egbert Law Offices, PLLC

(57) ABSTRACT

An integrated positioning mechanism of hydrant shell plate, of which the hydrant has an upper shell plate, a lower shell plate and an integrated positioning mechanism; the upper shell plate has a pedestal, an upper base plate, screw holes and a mating side; the lower shell plate is assembled beneath the upper base plate of the upper shell plate, and provided with two threading seats and an assembly side; moreover, the integrated positioning mechanism comprises a locking portion with a flange and a concave coupled together, as well as two bolts, thus enabling limited assembly of the upper and lower shell plates; with this unique design, the present invention allows two bolts and the locking portion to position the hydrant more stably and firmly by a three-point fixation way, thus improving substantially the quality of the hydrant with innovative applicability.

2 Claims, 4 Drawing Sheets

INTEGRATED POSITIONING MECHANISM OF HYDRANT SHELL PLATE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a hydrant. More particularly, the present invention relates to an innovative hydrant which is configured with an integrated positioning mechanism of shell plate.

2. Description of Related Art

Including Information Disclosed Under 37 CFR 1.97 and 37 CFR 1.98.

A conventional integrated positioning mechanism of hydrant shell plate is provided with an exhaust pipe, which is arranged between the upper and lower shell plates to form a hydrant together with a water supply seat fitted with a switch handle and a faceplate. The lower and upper shell plates are rabbeted together, and a mating plate is placed at the bottom of the lower shell plate for mating with the bottom of the upper shell plate. The front ends of upper and lower shell plates as well as the exhaust pipe are fixed by a discharge head, so the mating surface of the upper and lower shell plates can be interlocked securely.

However, the hydrant's upper and lower shell plates are coupled securely with the bottom by the front ends, leading possibly to a clearance at the central section of the shell plate and poorer coupling against the overall aesthetic effect.

Thus, to overcome the aforementioned problems of the prior art, it would be an advancement if the art to provide an improved structure that can significantly improve the efficacy.

Therefore, the inventor has provided the present invention of practicability after deliberate experimentation and evaluation based on years of experience in the production and development of related products.

BRIEF SUMMARY OF THE INVENTION

The enhanced efficacy of the present invention is as follows:

Based on the unique configuration of the present invention wherein the integrated positioning mechanism comprises a locking portion and two bolts, the locking portion of the present invention allows the mating of the flange and the concave, which is separately placed at the assembly side of the lower shell plate and the mating side of the upper base plate of the upper shell plate, so the upper and lower shell plates can be firstly locked by the locking portion, and then positioned more stably and firmly by two bolts in a three-point-fixation way, thus improving the quality of hydrant with innovative applicability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
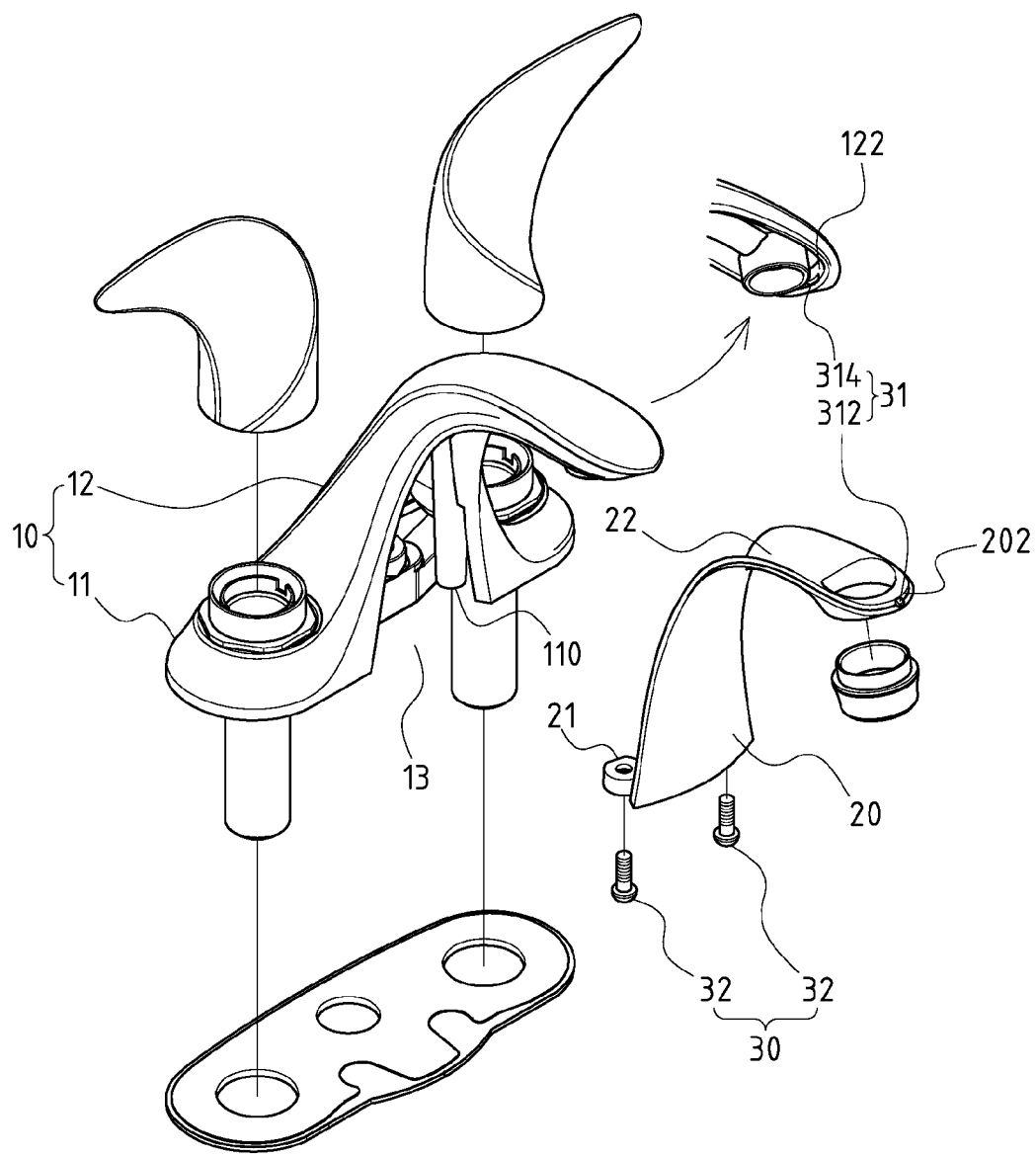
FIG. 1 shows an exploded perspective view of the preferred embodiment of the present invention.
Figure 2:
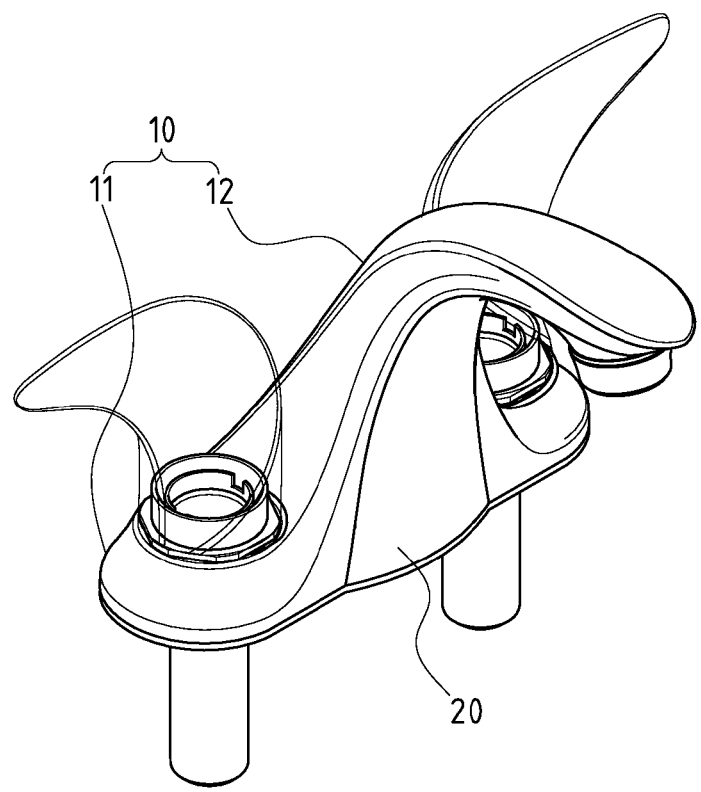
FIG. 2 shows a perspective view of the preferred embodiment of the present invention as assembled.
Figure 3:
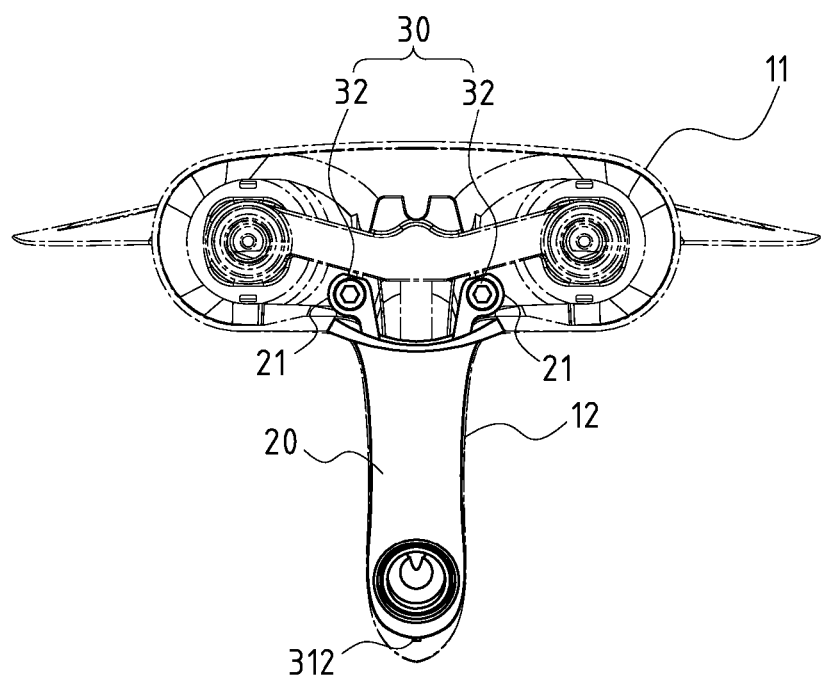
FIG. 3 shows a top view of the preferred embodiment of the present invention as assembled.
Figure 4:
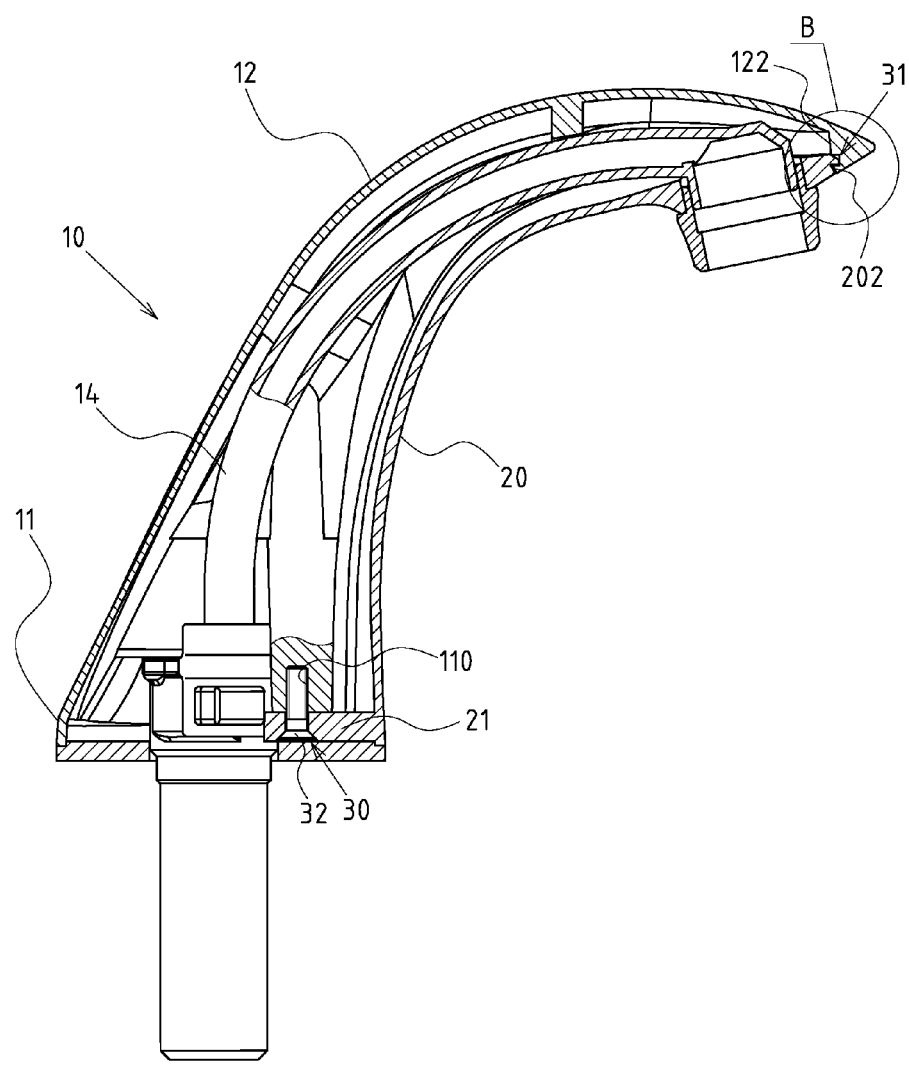
FIG. 4 shows a side view of the preferred embodiment of the present invention.
Figure 5:
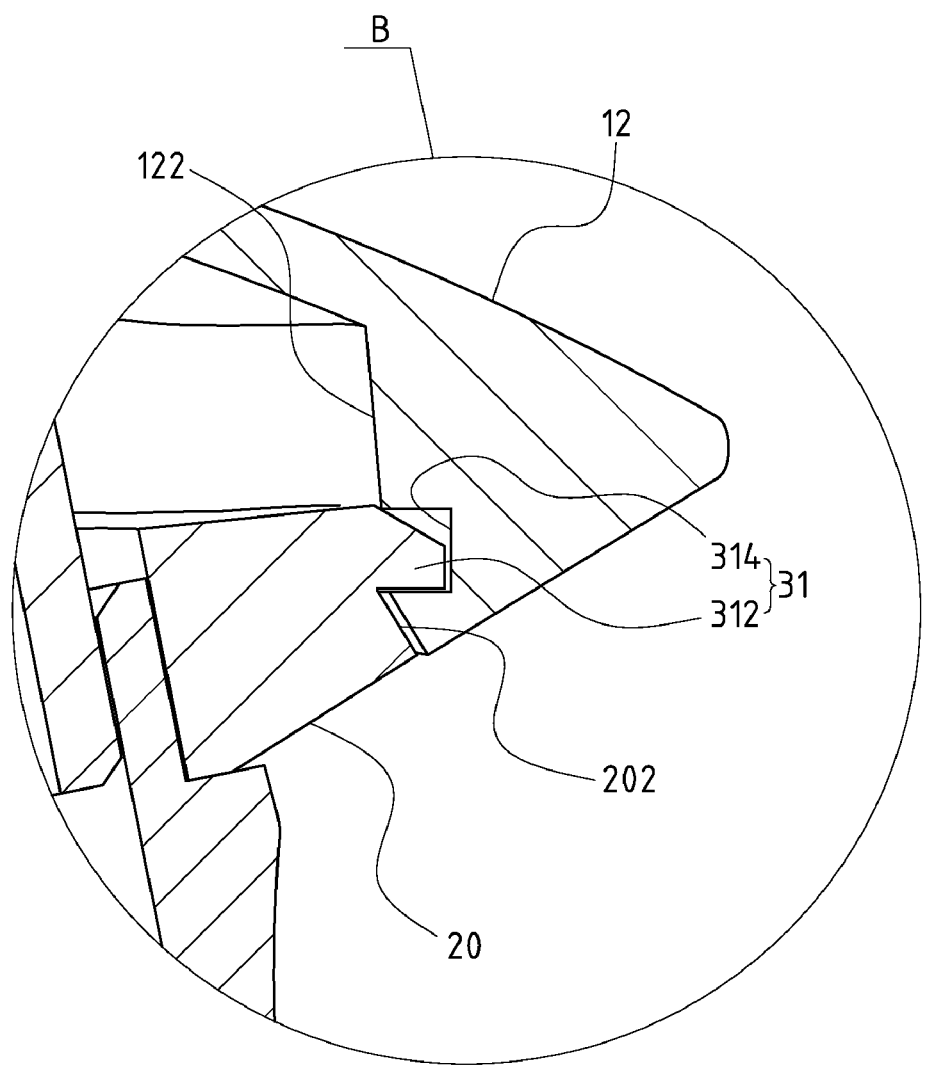
FIG. 5 shows a schematic view of the present invention.

FIGS. 1-5 depict preferred embodiments of an integrated positioning mechanism of hydrant shell plate of the present invention, which are provided for only explanatory objective for patent claims. The hydrant has an upper shell plate 10, further comprising a pedestal 11 and an upper base plate 12 extended from the pedestal 11. Two screw holes 110 are set at the preset location of the pedestal 11. The other end of the upper base plate 12 is bent into an arched shape, in front of which a mating side 122 is defined. A groove 13 is placed at the bottom, and used to accommodate an exhaust pipe 14. The upper shell plate 10 is used to cover on the exhaust pipe 14.

A lower shell plate 20 is assembled beneath and aligned with the upper base plate 12 of the upper shell plate 10. A groove 22 is set above it such that the exhaust pipe 14 can be arranged between the upper shell plate 10 and lower shell plate 20. The bottom of the lower shell plate 20 is protruded to form two threading seats 21, and an assembly side 202 is defined at the front end.

An integrated positioning mechanism 30 enables the limited assembly of the upper shell plate 10 and the lower shell plate 20. The integrated positioning mechanism 30 has a locking portion 31, further comprising a flange 312 and a concave 314 coupled together. The locking portion 31 is separately arranged at the mating side 122 of the upper base plate 12 and the assembly side 202 of the lower shell plate 20. In the preferred embodiment of the present invention, the flange 312 is placed at the assembly side 202 of the lower shell plate 20, and the concave 314 opened at the mating side 122 of the upper base plate 12 of the upper shell plate 10.

Two bolts 32 are bolted into the screw hole 110 of the upper shell plate 10 after penetrating the threading seat 21 of the lower shell plate 20.

Based on the above-specified structural configuration, the present invention is operated as follows:

Referring to FIG. 1, the flange 312 of the assembly side 202 of the lower shell plate 20 is firstly locked into the concave 314 at the mating side 122 of the upper base plate 12 of the upper shell plate 10. Next, two bolts 32 are bolted into the screw hole 110 of the upper shell plate 10 after penetrating the threading seat 21 of the lower shell plate 20. In this way, the assembly state of the upper and lower shell plates 10, 20 could be positioned securely (in collaboration with FIGS. 2, 4), moreover, the upper and lower shell plates 10, 20 could be coupled more stably and firmly by means of three-point fixation, thereby improving the quality and value of the hydrant with innovative applicability.

I claim:

1. A hydrant assembly comprising:

an upper shell plate having a pedestal and an upper base plate, said upper base plate extending from said pedestal, said pedestal having a pair of screw holes formed therein, said upper base plate having a mating side formed at a front thereof;

a lower shell plate assembled beneath said upper base plate of said upper shell plate, said lower shell plate having a pair of threading seats at a bottom thereof, said lower shell plate having an assembly side at a front end thereof;

a positioning mechanism connecting said upper shell plate to said lower shell plate, said positioning mechanism comprising:

a locking assembly having a flange and a receptacle engaged together, said locking assembly having a first portion on said mating side of said upper shell plate, said locking portion having a second portion on said assembly side of lower shell plate; and a pair of bolts respectively affixed to said pair of screw holes of said upper shell plate, said pair of bolts respectively extend through said pair of threading seats of said lower shell plate.

2. The hydrant assembly of claim 1, said first portion of said locking assembly being a receptacle formed in said mating side of said upper shell plate, said second portion of said locking assembly being a flange formed on said mating side of said upper shell plate, said flange affixed within said receptacle.

* * * * *